United States Patent [19]
Smith

[11] Patent Number: 4,987,508
[45] Date of Patent: Jan. 22, 1991

[54] PERMANENT MAGNET SHAPED TO PROVIDE UNIFORM BIASING OF A MAGNETORESISTIVE REPRODUCE HEAD

[75] Inventor: Neil Smith, San Diego, Calif.

[73] Assignee: Eastman Kodak Company, Rochester, N.Y.

[21] Appl. No.: 288,926

[22] Filed: Dec. 23, 1988

[51] Int. Cl.⁵ .............................................. G11B 5/39
[52] U.S. Cl. ................................................... 360/113
[58] Field of Search ..................... 360/113; 338/32 R; 335/297, 302

[56] References Cited

U.S. PATENT DOCUMENTS

| | | | |
|---|---|---|---|
| 3,493,694 | 2/1970 | Hunt | 360/113 |
| 3,796,859 | 3/1974 | Thompson | 360/113 |
| 4,623,867 | 11/1986 | Lundquist et al. | 360/113 |

FOREIGN PATENT DOCUMENTS

| | | | |
|---|---|---|---|
| 62-46418 | 2/1987 | Japan | 360/113 |
| 2091025 | 7/1982 | United Kingdom . | |

Primary Examiner—Robert S. Tupper
Attorney, Agent, or Firm—Dennis P. Monteith

[57] ABSTRACT

The invention teaches modifying the shape of a bar magnet which is uniformly magnetized either in the direction of its height or width to increase the volume of magnetic material at each end of the magnet. This results in increased magnetic field contribution from the magnet ends which modifies the field direction at the magnet faces so that the field lines converge rather than diverge just as they enter and leave the central portion of the magnet. Further along the field direction, the field lines change from being convergent to again being divergent, as is the usual case for a conventional bar magnet. Because of this transition there is an extended region over which the field lines are effectively straight and parallel, i.e. the field is uniform. This uniformity has been attained without increasing the length of the magnet, and a bar magnet so modified according to the teaching of the invention is suitable for the uniform biasing of MR elements in a single track or in a multi-track head.

14 Claims, 4 Drawing Sheets

PERMANENT MAGNET SHAPED TO PROVIDE UNIFORM BIASING OF A MAGNETORESISTIVE REPRODUCE HEAD

BACKGROUND OF THE INVENTION

1. Field of the Invention

This invention relates to a permanent magnet shaped to provided an extended region of uniform magnetic field, and in particular, a magnet shaped to provide a region of uniform magnetic field for biasing a magnetoresistive reproduce head.

Figure 1:
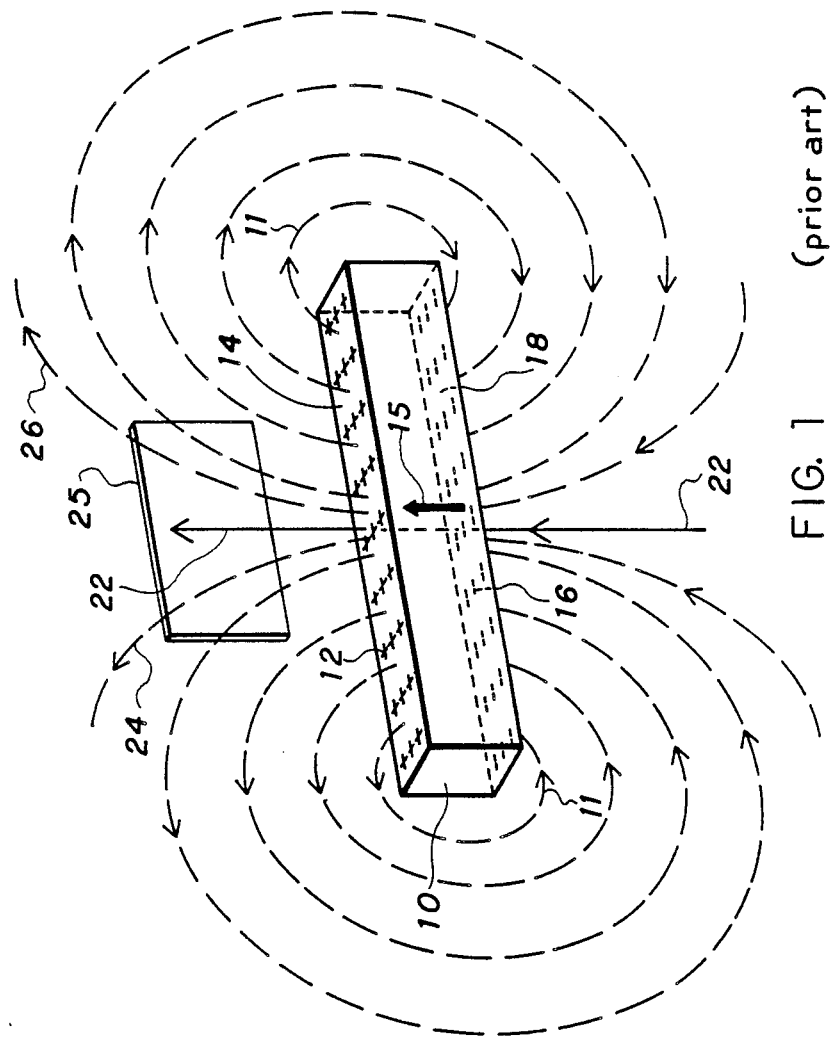
Figure 2:
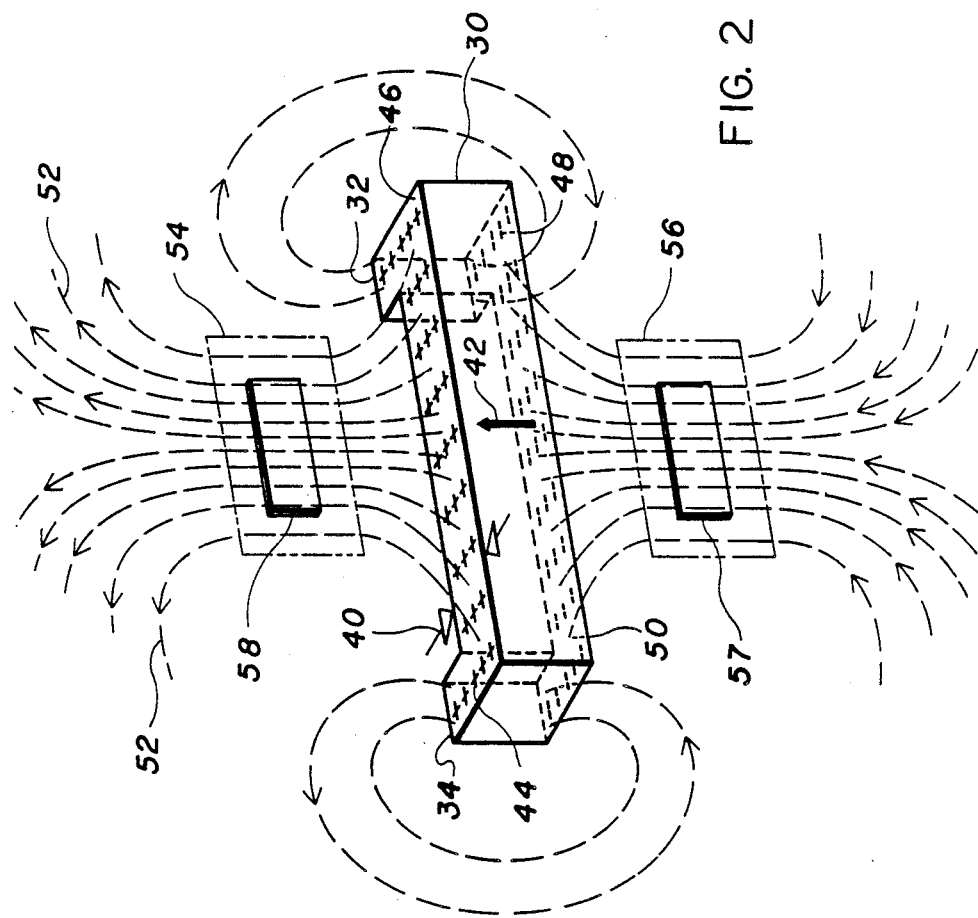
Figure 3:
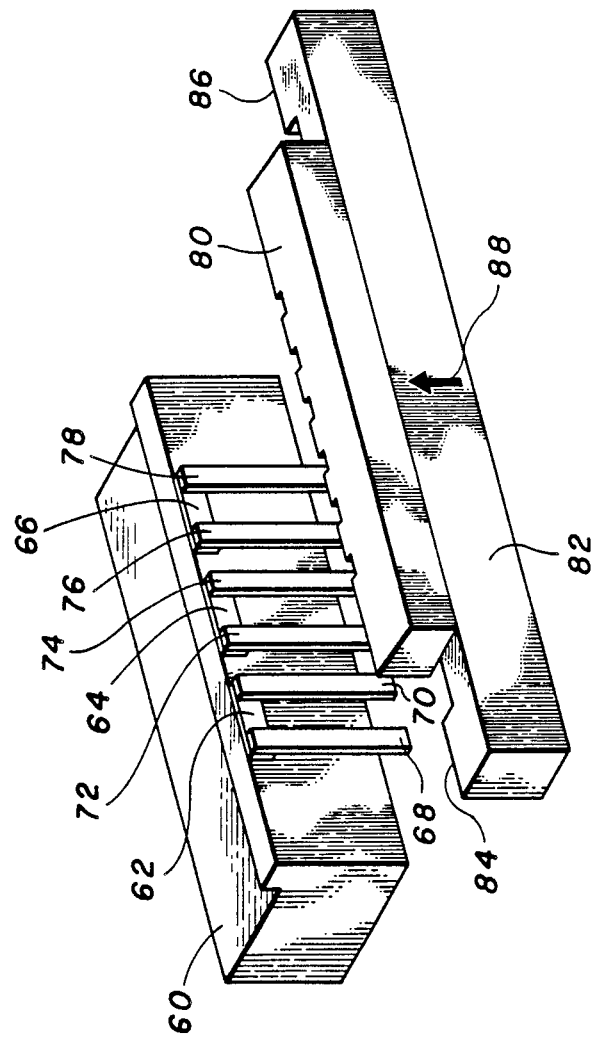
Figure 4:
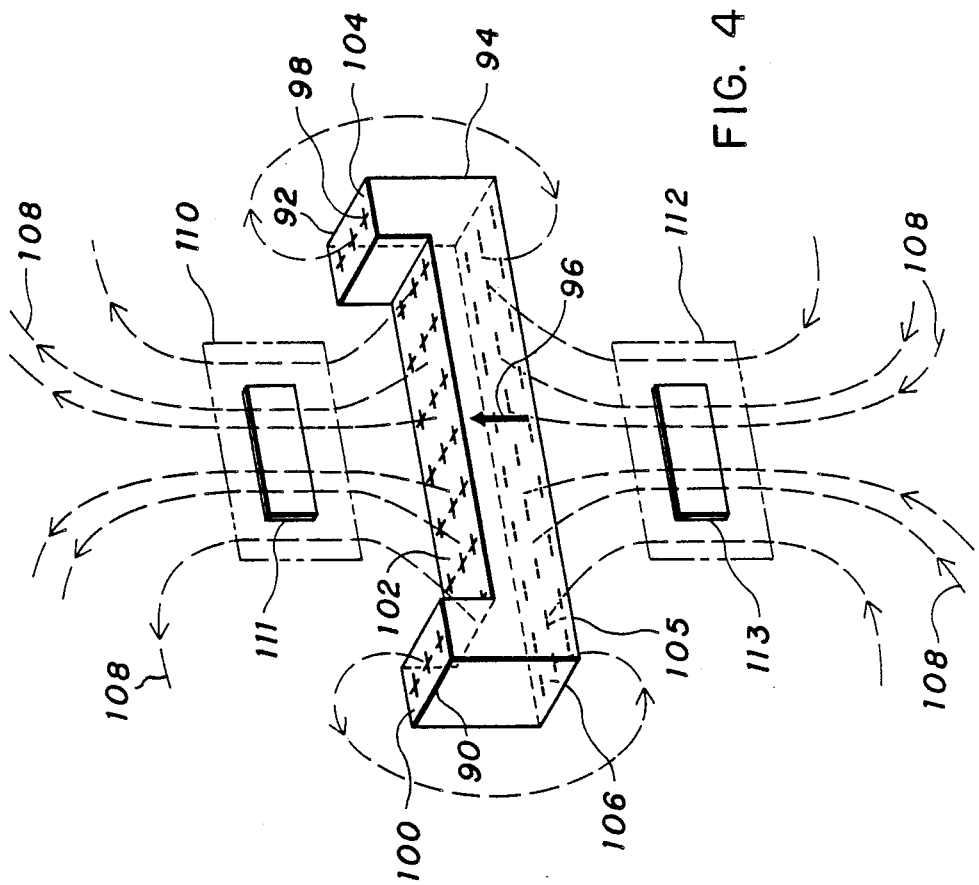

The invention, as well as the prior art, will be described with reference to the figures, of which, FIG. 1 is a perspective drawing of a permanent magnet and its associated magnetic field known in the prior art, FIG. 2 is a perspective drawing of a permanent magnet and its associated magnetic field in accordance with the present invention, FIG. 3 is an exploded view of a multitrack magnetoresistive reproduce head biased by a permanent magnet in accordance with the present invention, and FIG. 4 is a drawing of a second embodiment of a permanent magnet and its associated magnetic field in accordance with the present invention.

2. Description Relative to the Prior Art

The need for biasing the magnetoresistive (MR) element in an MR reproduce head to provide a linearized response in reproducing a magnetically recorded signal is well known in the art. A variety of techniques for biasing the MR element along its hard magnetic axis have been employed including permanent magnet biasing, soft adjacent layer biasing, barber pole biasing and shunt biasing. Examples of these biasing techniques may be found in U.S. Pat. Nos. 3,493,694, 3,840,898, 4,052,748 and 3,967,368.

Permanent magnet biasing is particularly advantageous in the case of multitrack heads because a single source of magnetic field serves to bias an entire array of MR elements. However, in the prior art, the use of a permanent bar magnet has been accompanied by problems of field non uniformity which results in detrimental variation in the bias point across the dimensions of the MR element. Referring to FIG. 1, a permanent bar magnet 10, in the shape of a rectangular parallelepiped and uniformly magnetized in the direction of its height, has field lines originating on positive magnetic charges 12 on one face 14 of the magnet 10, and terminating on minus magnetic charges 16 on an opposite face 18. (Following common practice, the longest dimension of the magnet is designated as "length" and the two mutually orthogonal shorter dimensions are designated as "height" and "width". Also, as in understood and accepted in the art, the term magnetic "charge" is a convenient fiction to represent the normal component of the magnetization at the surface where the "charge" is said to exist.) The lines 11 are typical external magnetic field lines of the magnet 10. It will be seen that the field lines are symmetrical with respect to a plane perpendicular to the faces 14,18 and bisecting the length of the magnet 10. Except for the field line 22, the field lines all diverge as they leave the face 14 and as they engage the face 18. When used for biasing an MR element, the MR element 25 is placed in the field of the magnet 10 where the MR element 25 experiences a uniform field 22 over only a very small portion of its volume. Other field lines which thread the MR element 25, i.e. 24 and 26, have longitudinal components lying in opposite directions, and it is the change in direction of the longitudinal field component over the volume of the MR element which can detrimentally affect the operation of the MR element 25. It is possible to provide a larger region of bias field substantially uniform in magnitude and direction (i.e. with essentially zero longitudinal component) by increasing the length of the magnet relative to the size of the MR element. The drawback in this technique, however, is a long unwieldy magnet resulting in an excessively bulky head assembly.

SUMMARY OF THE INVENTION

The invention teaches modifying the shape of a bar magnet, which is uniformly magnetized either in the direction of its height or width, to increase the volume of magnetic material at each end of the magnet. This results in increased magnetic field contribution from the magnet ends which modifies the field direction at the magnet faces so that the field lines converge rather than diverge just as they enter and leave the central portion of the magnet. Further along the field direction, the field lines change from being convergent to again being divergent, as is the usual case for a conventional bar magnet. Because of this transition there is an extended region over which the field lines are effectively straight and parallel, i.e. the field is uniform in both magnitude and direction without a significant longitudinal component. This uniformity has been attained without increasing the length of the magnet, and a bar magnet so modified according to the teaching of the invention is suitable for the uniform biasing of MR elements in a single track or in a multitrack head.

Two embodiments of the invention each having the same geometrical shape are disclosed. In both embodiments the widths of the magnet ends are increased relative to a bar magnet, however, in the first embodiment the magnetization lies along the height direction, while in the second embodiment the magnetization lies along the width direction. Both embodiments provide additional volumes of magnetic material that modify the magnetic fields arising at the magnet ends. In the first embodiment, the quantity of magnetic charge at the ends is increased, while in the second embodiment the magnetically charged surfaces at the ends of the magnet are displaced. The overall effect, in both cases, is the improved uniformity of the external field in the central region of the magnet.

DESCRIPTION OF THE INVENTION

In accordance with the first embodiment of the invention, and referring to FIG. 2, the ends 32, 34 of a bar magnet 30 have increased widths compared to the width 40 in the central region of the bar magnet 30. The magnet 30 is uniformly magnetized in its height direction 42, with resultant plus magnetic charges 44 appearing on the surface 46 and minus magnetic charges 48 appearing on the opposite surface 50. Because the ends 32,34, of the magnet 30 have been widened, there are additional charges present at the ends 32,34 over that present on the conventional uniformly wide bar magnet. These additional charges modify the field direction, and the lines of force 52 emanating from the magnet surface 46 initially converge rather than diverge as they leave the magnet 30. With increasing distance from the magnet 30 the lines 52 begin to diverge, but in the transition region between convergence and divergence of the field lines 52, the field lines are substantially straight and parallel, i.e. the field is highly uniform in both magnitude and direction. Similarly, as the lines 52 terminate on the minus charge 48 on the surface 50, they also change from being divergent to being convergent with an attendant region 56 containing a substantially uniform field. It will be appreciated than an MR element 58 placed in the uniform field region 54, or an MR element 57 placed in the uniform field region 56, will experience a bias field free of a detrimental longitudinal component which varies in direction across the volume of the MR element.

Referring to FIG. 3, the teaching of the invention is applied to the biasing of a typical multitrack MR reproduce head fabricated on a substrate 60 upon which is deposited three track defining MR elements 62,64,66. Leads 68,70 are provided to conduct the sense current required for the MR element 62, and corresponding leads 72,74 and 76,78 carry the sense currents for the MR elements 64,66 respectively. A coverplate 80 is adhesively fastened to the substrate 60 and a magnet 82 whose ends 84, 86 are widened, as taught by the invention, is magnetized in the direction 88 to provide a substantially uniform bias field at the MR elements 62,64,66 as previously described.

A second embodiment of the invention is shown in FIG. 4, wherein the ends 90,92 of a magnet 94 are enlarged by similarly extending the ends in the width direction. In this embodiment, however, the magnetization 96 lies in the direction of the width of the magnet 94, rather than in the direction of its height. The plus charges 98, which now appear upon the displaced surfaces 100,104 and on the surface 102 of the magnet 94, and the negative charges 105 which appear on the surface 106 modify the external field configuration so that, as in the previous embodiment, the field lines 108 initially converge and then diverge to provide the regions 110,112 of substantially uniform field. An MR element 111 placed in the uniform field region 110 or an MR element 113 placed in the uniform field region 112 will be, therefore, uniformly biased.

It will be appreciated that the resultant geometrical shapes of the magnets disclosed in the above first and second embodiments of the invention are the same. These shapes may be designed as "C" shaped structures in which material of identical cross section has been added to the ends of a bar having a rectangular cross section. As previously stated, however, in the first embodiment the magnetization 42 (FIG. 2) is along the height direction, while in the second embodiment the magnetization 96 (FIG. 4) is along the width direction. It will be further noted that the teaching of the invention may be applied either to conventionally fabricated bulk magnets or to deposited magnets.

The invention has been described in detail with particular reference to preferred embodiments thereof, but it will be understood that variations and modifications can be effected within the spirit and scope of the invention.

What is claimed is:

1. A magnet for biasing a magnetoresistive element utilized in a magnetoresistive head, said magnet comprising:
   a. magnetic material in the shape of a rectangular parallelepiped bar having mutually orthogonal length, height, and width dimensions, wherein the longest dimension of said magnet is designated as "length" and the two mutually orthogonal shorter dimensions are designated as "height" and "width",
   b. magnetization means for uniformly magnetizing said bar along said height dimension, whereby magnetic charges are generated on first and second surfaces of said bar perpendicular to the direction of said magnetization, and
   c. means for modifying the distribution of said charges at the longitudinal end regions of said bar, whereby the external field of said magnet has an extended region of uniform field for biasing said magnetoresistive element utilized in said magnetoresistive head.

2. The magnet of claim 1 wherein said magnetization means is means for permanently magnetizing said magnetic material.

3. The magnet of claim 2 wherein said means for modifying the distribution of said charge at the longitudinal end regions of said bar is means for extending the width of said bar at said longitudinal end regions.

4. A magnet for biasing a magnetoresistive element utilized in a magnetoresistive head, said magnet comprising:
   a. magnetic material in the shape of a rectangular parallelepiped bar having mutually orthogonal length, height, and width dimensions, wherein the longest dimension of said magnet is designated as "length" and the two mutually orthogonal shorter dimensions are designated as "height" and "width",
   b. magnetization means for uniformly magnetizing said bar along said width dimension, whereby magnetic charges are generated on first and second surfaces of said bar perpendicular to the direction of said magnetization, and
   c. means for modifying the distribution of said charges at the longitudinal end regions of said bar, whereby the external field of said magnet has an extended region of uniform field for biasing said magnetoresistive element utilized in said magnetoresistive head.

5. The magnet of claim 4 wherein said magnetization means is means for permanently magnetizing said magnetic material.

6. The magnet of claim 5 wherein said means for modifying the distribution of said charge at the longitudinal end regions of said bar, is means for extending the width of said magnetized bar at said longitudinal end regions.

7. A magnet for biasing a magnetoresistive element utilized in a magnetoresistive reproduce head, said magnet comprising:
   a. a permanent magnetic material having a "C" shaped structure of rectangular cross-section, wherein the longest dimension of said magnet is designated as "length" and the two mutually orthogonal shorter dimensions are designated as "height" and "width",
   b. uniform magnetization in said "C" shaped structure wherein said magnetization lies in the width direction of said cross section to provide an extended region of uniform field proximate said magnet, said extended region lying along said width direction, and said magnetoresistive element further being located in said extended region whereby said magnetoresistive element utilized in said magnetoresistive head is biased.

8. A magnet for biasing a magnetoresistive element utilized in a magnetoresistive reproduce head, said magnet comprising:
   a. a permanent magnetic material having a "C" shaped structure of rectangular cross-section, wherein the longest dimension of said magnet is designated as "length" and the two mutually orthogonal shorter dimensions are designated as "height" and "width",
   b. uniform magnetization in said "C" shaped structure wherein said magnetization lies in the height direction of said cross section to provide an extended region of uniform field proximate said magnet, said extended region lying along said width direction, and said magnetoresistive element further being located in said extended region whereby said magnetoresistive element head is biased.

9. A magnetoresistive head for reproducing signal recorded on a magnetic medium, said head comprising:
   a. a non magnetic substrate,
   b. magnetoresistive means having a hard magnetic axis, said magnetoresistive means being deposited on said substrate,
   c. permanent magnet means for biasing said magnetoresistive means along said hard magnetic axis, said permanent magnet means further comprising,
      1. permanent magnetic material having a "C" shaped structure of rectangular cross section, wherein the longest dimension of said permanent magnetic material is designated as "length" and having two mutually orthogonal shorter dimensions designated as "height" and "width", said cross section further comprising the height and width dimensions of said "C" shaped structure,
      2. uniform magnetization of said "C" shaped structure, said magnetization lying along said height dimension of said "C" shaped structure, wherein said permanent magnetic material provides an extended region of uniform field proximate said permanent magnetic material, said extended region lying along said height direction, and said magnetoresistive element further being located in said extended region whereby said permanent magnetic material coacts with said magnetoresistive means to uniformly bias said magnetoresistive means along said hard magnetic axis.

10. The magnetoresistive head of claim 9 wherein said permanent magnet means is a deposited permanent magnet.

11. The magnetoresistive head of claim 9 wherein said magnetoresistive means comprises a plurality of magnetoresistive elements configured in a multitrack magnetoresistive reproduce head.

12. The magnetoresistive had for reproducing signal recorded on a magnetic medium, said head comprising:
   a. a non magnetic substrate,
   b. magnetoresistive means having a hard magnetic axis, said magnetoresistive means being deposited on said substrate,
   c. permanent magnet means for biasing said magnetoresistive means along said hard magnetic axis, said permanent magnet means further comprising,
      1. permanent magnetic material having a "C" shaped structure of rectangular cross section, wherein the longest dimension of said permanent magnetic material is designated as "length" and having two mutually orthogonal shorter dimensions designated as "height" and "width", said cross section further comprising the height and width dimensions of said "C" shaped structure,
      2. uniform magnetization of said "C" shaped structure, said magnetization lying along said width dimension of said "C" shaped structure, wherein said permanent magnetic material provides an extended region of uniform field proximate said permanent magnetic material, said extended region lying along said width direction, and said magnetoresistive element further being located in said extended region whereby said permanent magnetic material coacts with said magnetoresistive means to uniformly bias said magnetoresistive means along said hard magnetic axis.

13. The magnetoresistive head of claim 12 wherein said permanent magnet means is a deposited permanent magnet.

14. The magnetoresistive head of claim 12 wherein said magnetoresistive means comprises a plurality of magnetoresistive elements configured in a multitrack magnetoresistive reproduce head.

* * * * *

UNITED STATES PATENT AND TRADEMARK OFFICE
CERTIFICATE OF CORRECTION

PATENT NO. : 4,987,508
DATED : January 22, 1991
INVENTOR(S) : Neil Smith

It is certified that error appears in the above-identified patent and that said Letters Patent is hereby corrected as shown below:

Column 5, line 15    delete "width" and replace with --height--

Column 6, line 10    delete "The" and replace with --A--, and delete "had" and replace with --head--.

Signed and Sealed this

Seventh Day of July, 1992

*Attest:*

DOUGLAS B. COMER

*Attesting Officer*    Acting Commissioner of Patents and Trademarks